March 5, 1929. J. H. JOHNSON 1,704,613
VEHICLE WHEEL
Filed April 12, 1926 2 Sheets-Sheet 1

Inventor
James H. Johnson
By Lancaster and Allwine
Attorneys

March 5, 1929.   J. H. JOHNSON   1,704,613
VEHICLE WHEEL
Filed April 12, 1926   2 Sheets-Sheet 2

Inventor
James H. Johnson

Patented Mar. 5, 1929.

1,704,613

UNITED STATES PATENT OFFICE.

JAMES H. JOHNSON, OF SAN MATEO, CALIFORNIA.

VEHICLE WHEEL.

Application filed April 12, 1926. Serial No. 101,497.

This invention relates to improvements in vehicle wheels.

The primary object of this invention is the provision of an improved vehicle wheel adapted for use in connection with automotive vehicles, including a pneumatic supporting arrangement with an auxiliary tread which will take the support of a load incident to deflation of the pneumatic arrangement.

A further object of this invention is the provision of a novel type of vehicle wheel which embodies rigid supporting discs between which is arranged a relatively large annular compartment adapted to receive a pneumatic tire arrangement with a tread projecting beyond the supporting discs, the latter also being provided with an auxiliary tread which will come into play in case of deflation of the pneumatic feature.

Other objects and advantages of this invention will be apparent during the course of the following detailed description.

In the accompanying drawings, forming a part of this specification, and wherein similar reference characters designate corresponding parts throughout the several views.

Figure 1:
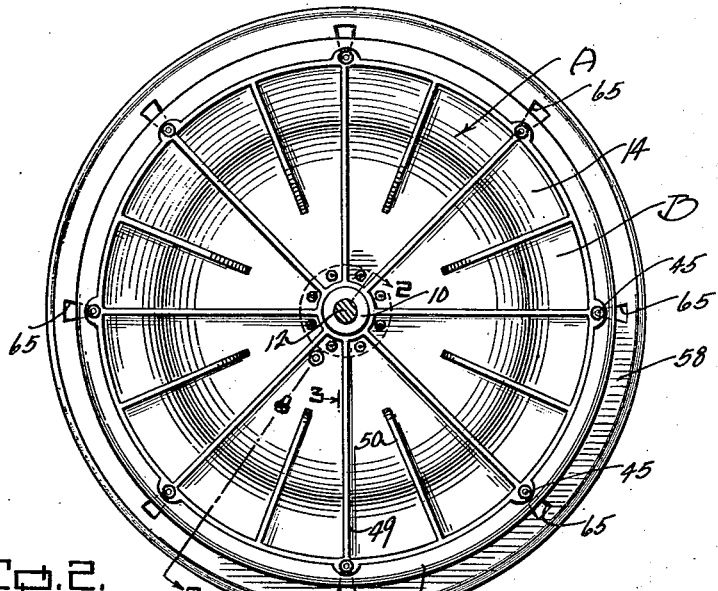
Figure 1 is a side elevation of the improved vehicle wheel, showing operatively connected details thereof.

In the drawings, wherein for the purpose of illustration is shown only a preferred embodiment of the invention, the letter A may generally designate the improved wheel, which may comprise a metal casing construction B wherein a pneumatic tube C may be received in a cooperating relation with a solid tread construction D. Auxiliary supporting tires, preferably solid in nature, are provided at E and F on the periphery of the casing construction B.

The tire casing construction B is rigid, and of metal, and adapted to sustain the load of the vehicle. It comprises a hub construction 10, through which the conventional spindle bore 11 is provided for receiving the spindle 12. The hub 10 is integrally provided with an annular extension 13, at the outer side from which annularly extends the metal disc or wall 14 which in cross section radially of the wheel is substantially in the form of a reverse curve. At its outer end the discs 14 is provided with a channel 15, including a base portion 16 integrally connected between its ends on the disc 14; the channel 15 furthermore including the annularly outstanding legs 18 and 19 to provide a groove 20 therebetween in which is adapted to be disposed an auxiliary resilient tire 22, preferably of the solid rubber type.

Figure 2:
Figure 2 is an enlarged fragmentary sectional view taken through a portion of the vehicle wheel substantially on the line 2—2 of Figure 1.

The casing construction B furthermore includes a rigid disc 25 of substantially the same construction as the disc 14, the same in cross sectional radially of the wheel being in the form of a reverse curve. The disc 25 is provided with an annular ring-shaped portion 27 at the center thereof, thicker than the disc 25, thru which an aperture 28 is provided adapted to receive the hub 10 therein as is illustrated in Figure 2 of the drawings. Thus, the disc 25 is detachable with respect to the disc 14, and is adapted to be slipped over the hub 10, to place the portions 13 and 27 of the discs 14 and 25 in an abutting relation for assemblage on the hub. The portions 13 and 27 are suitably apertured transversely thereof for receiving bolts 30 for connecting the said discs 14 and 25 at the hub of the wheel, and between the facing surfaces of the portions 13 and 27 the wheel has an annular or ring-shaped packing or washer 31 which is compressed as the bolts 30 are tightened, to provide an airtight sealed connection between the discs 14 and 25 at the center or hub of the wheel.

When the discs 14 and 25 are assembled as above described, they diverge radially outwardly from the hub 10, toward the outer edges, to provide a large compartment wherein is adapted to be received details of the pneumatic tire arrangement of the vehicle wheel.

At its outer periphery the detachable disc 25 is provided with a tire supporting channel 35 of ring-shaped formation, which includes the base 36 connected between the side edges thereof on the disc 25 with an integral connection; the channel 35 furthermore including the annular outstanding legs 37 and 38 to provide the annular groove 39 for receiving the solid or other type of auxiliary tire 40 therein.

When the discs 14 and 25 are assembled as above mentioned by means of the bolts 30, the auxiliary tires 22 and 40 are disposed in a spaced relation, to provide an annular space 42 therebetween, through which details of the main wheel tire arrangement extend, as will be subsequently described. The auxiliary tires 22 and 40 are of the same diameter and the channels of the respective discs 14 and 25 are likewise of the same diameter to receive the auxiliary tires as above mentioned, and as illustrated in the drawings.

The discs 14 and 25, and more particularly the channels 15 and 35 thereof are bolted in a predetermined spaced relation which cannot be extended, in order to hold the wheel in a predetermined relation for properly supporting the pneumatic tire elements. To this end it is preferred to transversely aperture the legs 18, 19, 37 and 38 of the channels 15 and 35, as illustrated in Figure 3 of the drawings, through which relatively long bolts 45 may be extended, with the head 46 at one end thereof in abutment with an outer side of the channel 15 and the opposite end of the bolt being screw threaded for adjustably receiving a nut 47 adapted to abut against the outer side of the other channel 35 to prevent variation or enlargement of the space 42 between the auxiliary treads 22 and 40.

It is to be particularly noted that both the discs 14 and 25 are of the rigid load sustaining type, and the same will not transversely flex. Each of these discs is reinforced at the outer surface thereof, by providing long radial ribs 49, which extend from the channels 15 and 35 of the respective discs to the hub 10 of the wheel. Alternate short reinforcing ribs 50 are also provided which extend from the respective channels 15 and 35 of the discs 14 and 25 and terminate short of the hub of the wheel. This reinforcing arrangement is important.

Referring to the tread construction D, the same includes a body portion 55 adapted to be received in the compartment between the discs 14 and 25 immediately below the bases 16 and 36 of the channels 15 and 35 respectively; this body portion 55 of the tread construction D being of annular band-shaped formation, and in the outer marginal portions thereof being reinforced by cables 56 in the well known manner. At the outer circumference the body portion 55 of the tread construction is provided with a reduced annular tread 58, of preferably solid rubber, which is equivalent in width to the space 42, substantially, and extends through said space 42 into a projecting relation beyond the outer peripheries of the auxiliary treads 22 and 40, as is illustrated in the various views of the drawings. Side wings 60 and 61 are also integrally provided as a part of the tread construction D, being formed integral with the body 55 of the tread construction D at the outer margin portions of the said body portion 55, and each of the wings 60 and 61 being annular in form and extending at the opposite sides of the body 55, towards the center of the hub, with respect to the tread portion 58. Each of these wings 60 and 61 is reduced in cross section, or tapered from the connection thereof with the body 55 to the free edge thereof facing the hub, where the same has a substantially chisel edge. The wings 60 and 61 in cross section are slightly arcuate and adapted to snugly fit in an abutting and conforming relation with the outer curved parts of the discs 14 and 25 and it is even preferred to adhere the outer surfaces of the wings 60 and 61 to the respective inside abutting surfaces of the discs 14 and 25, by some appropriate adhesive, to prevent relative movement of the wings with respect to the discs and consequently to prevent wear.

Figure 3:
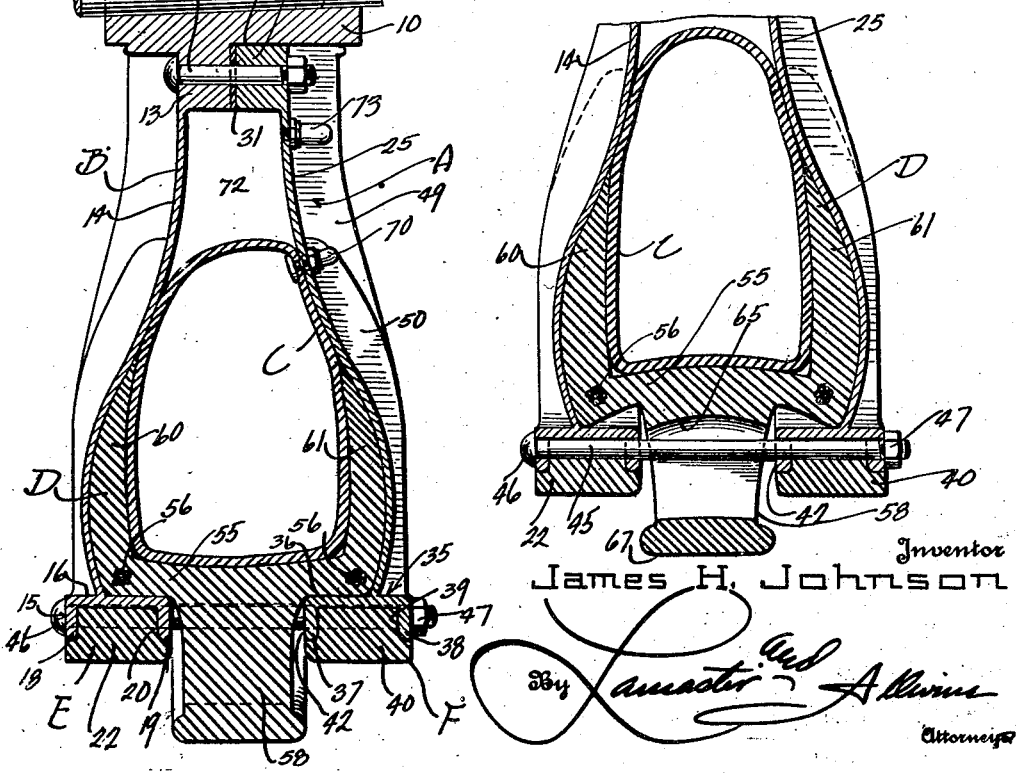
Figure 3 is a fragmentary sectional view taken substantially on the line 3—3 of Figure 1, showing the parts flexed as they will substantially appear when the tire supports a load.
Figure 4:
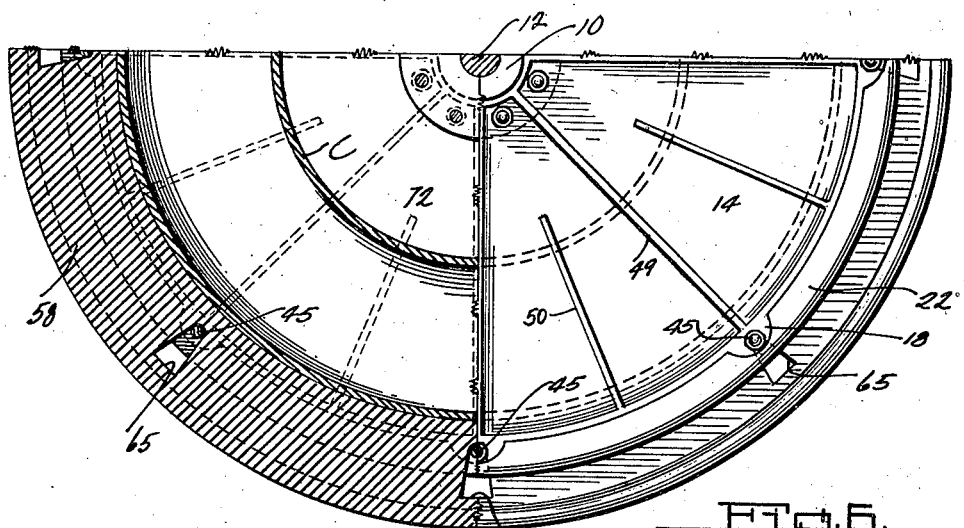
Figure 4 is a fragmentary view, partly in section, showing features of construction of the wheel.

From the foregoing description of the said construction D, it is quite obvious that the body portion 55 thereof which transversely extends across the space 42 inwardly of the auxiliary treads is of a flexible nature, and the same will flex as illustrated in Figure 3 of the drawings to permit the tread portion 58 to reciprocate through the opening 42 between the auxiliary treads, during rotation of the wheel, when supporting the load on a ground surface.

An important feature of the invention is the provision of radial slots 65 in the tread portion 58 of the tread construction D; these slots 65 being tapered radially of the wheel, and being of least width at their ends closest to the center of the wheel and tapering therefrom at an increasing width to a point short of the outer ground engaging surface 67 of the tread portion 58, as is illustrated in Figure 3. Incident to the elongated character of these slots 65, radially of the wheel, and incident to the fact that the same receive therein the intermediate portions of the bolts 45, it is quite obvious that the bolts 45 will not interfere with the flexing of the tread construction D, as is illustrated in Figure 3. These bolts prevent creeping of the tire construction D relative to the discs of the retaining casing B, and they also serve a very important function in preventing any lateral expansion or outward movement of the discs 14 and 25 incident to the reception of the pneumatic tire therein. By not extending the slots 65 to the ground engaging surface of the tread portion 58 it is quite obvious that the tread construction D is formed in a relation to preserve the circumferential continuity of the ground engaging portion of the tread portion 58, and this is important, as can readily be understood.

Referring to the pneumatic arrangement of the wheel A, it is preferred to use a pneumatic inner tube C in the compartment between the discs 14 and 25 and inwardly of the tread construction D between the wings 60 and 61 theerof. This inner tube C fits only in the outer annular portion of the compartment between the discs 14 and 25, and it is provided with an air inlet and exhaust valve 70 of conventional construction, which is preferably connected on the disc 25 so that the same may be accessible. Between the inner tube C and the hub of the wheel is provided a compartment 72, which may be termed a super-air pressure compartment, wherein it is intended to provide an elevated air pressure, which will augment the pneumatic cushioning of the wheel produced by the inner tube C, when inflated, and assists in the pneumatic efficiency of the wheel. An air inlet and exhaust valve 73 of conventional form is also provided on the disc 25 for the compartment 72, as is illustrated in Figure 2 of the drawings.

From the foregoing description the operation of the invention will be apparent. Normally the tread portion 58 protrudes from the space 42 between the auxiliary treads 22 and 40, incident to the air pressure in the inner tube C and the air pressure in the super-air pressure compartment 72. If the inner tube is deflated in any manner whatsoever, as by puncture, or low air pressure, it is at once apparent that the auxiliary treads 22 and 40 will receive the load being supported. The super-air pressure compartment aids materially in the pneumatic efficiency of the wheel, and augments the pneumatic action of the conventional inner tube C, as is quite obvious.

Figure 5:
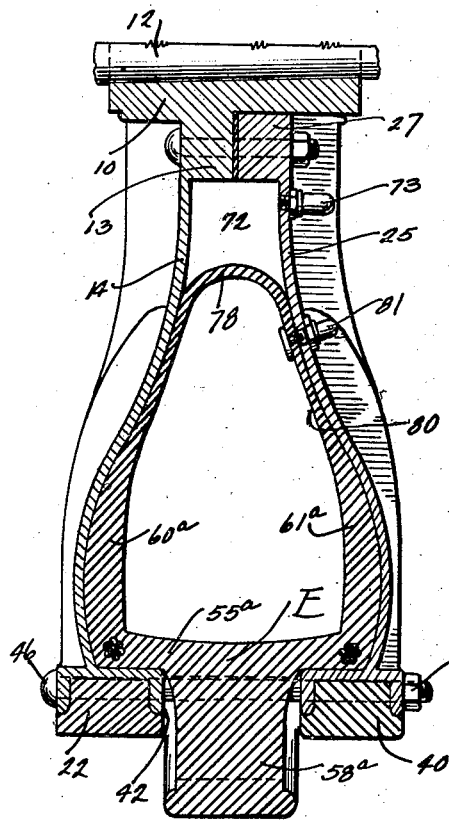
Figure 5 is a transverse sectional view showing a modified form of pneumatic tire arrangement for the wheel.
Figure 6:
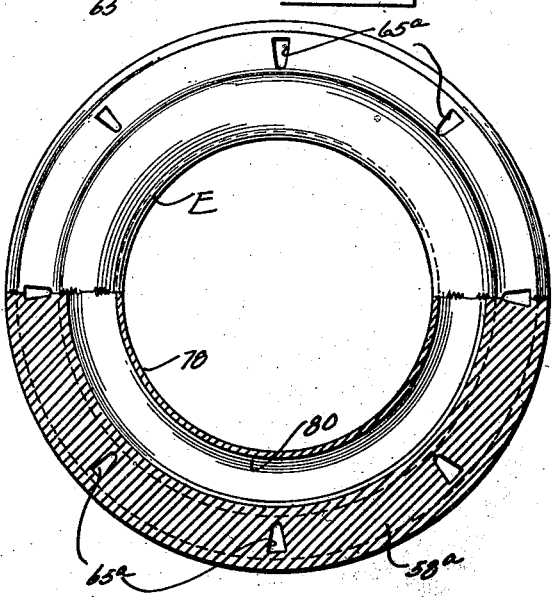
Figure 6 is a reduced sectional view taken through the pneumatic tire element of the wheel illustrated in Figure 5.

A modified form of invention is illustrated in Figures 5 and 6 of the drawings, wherein a type of combination solid and pneumatic tire E is provided, which embodies the outer portion $55^a$ corresponding to the portion 55 of the tread construction D above mentioned. On the outer circumference of the portion $55^a$ is provided a solid reduced tread portion $58^a$ adapted to protrude from the space 42 between the auxiliary tires 22 and 40 as illustrated in Figure 5 of the drawings, and this solid portion $58^a$ is provided with the slots $65^a$ therein, which are of identical construction as the slots or openings 65 above mentioned for the form of tread construction D. The tire E furthermore includes the side walls $60^a$ and $61^a$ which are integral at the outer side margins of the body portion $55^a$, and which are of relatively great thickness adjacent their juncture with the portion $55^a$ and reducing in thickness therefrom towards the center of the wheel; the said side wall portions $60^a$ and $61^a$ being integrally connected by a portion 78 at the annular inner periphery of the tire E, to provide an enclosed air pressure receiving compartment 80 80, which has a valve connection 81 with the disc 25, and which compartment 80 may receive air pressure, thus dispensing with the use of a pneumatic tube such as provided for the form of invention illustrated in Figure 2. In the form of tire E the same combines the solid and pneumatic features in a single integral construction. The super-pressure compartment 72 is of course also provided when the tire E is used, identically in the manner above described.

From the foregoing description of this invention it is apparent that a type of vehicle wheel has been provided, embodying characteristics which render the same particularly safe for the sustaining of loads under practically all circumstances of usage. The improved wheel may be used in connection with a super-compression, or due to the large air chamber therein the same may be given the conventional balloon tire effect with low pressure. The improved tire uses but one pneumatic inner tube but provides two pneumatic compartments.

Various changes in the shape, size, and arrangement of parts may be made to the forms of invention herein shown and described, without departing from the spirit of the invention or the scope of the claim.

I claim:

In a vehicle wheel the combination of a body comprising spaced side walls, annular channels rigidly connected at the outer peripheries of each of the side walls, each channel comprising an annular base secured between its side edges to the respective side walls, and each channel furthermore including spaced outstanding annular flanges to define channel grooves facing at the outer periphery of the wheel, transverse openings in aligning relation thru the flanges of each of said channels, a detachable bolt extending through said openings, said channels being spaced from each other and the bolt extending across the said space, said bolt being related to the channels so as to retain them and the side walls in spaced relation, and a pneumatic tire in the space between the side walls including an annular tread portion extending outwardly thru the space between said channels and projecting annularly beyond the outer edges of the flanges of said channels, said tread portion being radially slotted to receive the bolt therethrough whereby the tread portion may move relative to the portion of the bolt which extends through said slot, and auxiliary cushion members annularly seated in said channels of less height than the tread above mentioned, with respect to the center of the wheel, said auxiliary cushion members being slotted at their inner peripheries to receive the bolt therethrough.

JAMES H. JOHNSON.